No. 851,928. PATENTED APR. 30, 1907.
F. M. GOODHUE.
MANURE SPREADER.
APPLICATION FILED NOV. 7, 1904.

No. 851,928. PATENTED APR. 30, 1907.
F. M. GOODHUE.
MANURE SPREADER.
APPLICATION FILED NOV. 7, 1904.

Witnesses,

Inventor,
Frank M. Goodhue,
By Offield, Towle & Linthicum
Attys.

No. 851,928. PATENTED APR. 30, 1907.
F. M. GOODHUE.
MANURE SPREADER.
APPLICATION FILED NOV. 7, 1904.

Witnesses,
Inventor,
Frank M. Goodhue
By Offield, Towle & Linthicum
Attys.

UNITED STATES PATENT OFFICE.

FRANK M. GOODHUE, OF BATAVIA, ILLINOIS.

MANURE-SPREADER.

No. 851,928.

Specification of Letters Patent.

Patented April 30, 1907.

Application filed November 7, 1904. Serial No. 231,818.

*To all whom it may concern:*

Be it known that I, FRANK M. GOODHUE, a citizen of the United States, residing at Batavia, in the county of Kane and State of Illinois, have invented certain new and useful Improvements in Manure-Spreaders, of which the following is a specification.

This invention relates to that type or class of manure spreaders wherein a drum carrying a series of radially-disposed spreader-prongs or fingers is rotatably mounted across the rear end of the wagon-body and is operated in conjunction with a traveling apron on which the manure is loaded so as to carry the body of the latter against the inner side of the drum as fast as portions thereof are thrown out and scattered by the ejecting fingers or prongs.

The general object of the invention is to provide an improved apparatus of increased capacity to effect desirable variations in the distribution of the manure and rendered thoroughly reliable in its operation through the provision of means which render its action automatic in character to the extent of the drum and apron-actuating mechanisms.

To these and other minor ends the invention consists in an apparatus of the class described possessing the novel features of construction and mode of operation substantially as hereinafter described and more particularly pointed out in the claims.

My invention, in an approved mechanical form, is illustrated in the accompanying drawings, wherein,—

Referring to the drawings, 1 designates as an entirety the body of the wagon, 2 the front axle, 3 the front wheels, 4 the rear axle, and 5 the rear wheels. The front axle 2 is connected with the front body-bolster 6 by a universal ball joint indicated at 7, Fig. 5, thereby enabling the tongue or pole 8 to be rigidly connected with the forward axle with freedom of up and down as well as lateral movement.

Figures 11, 12, 13, 14:
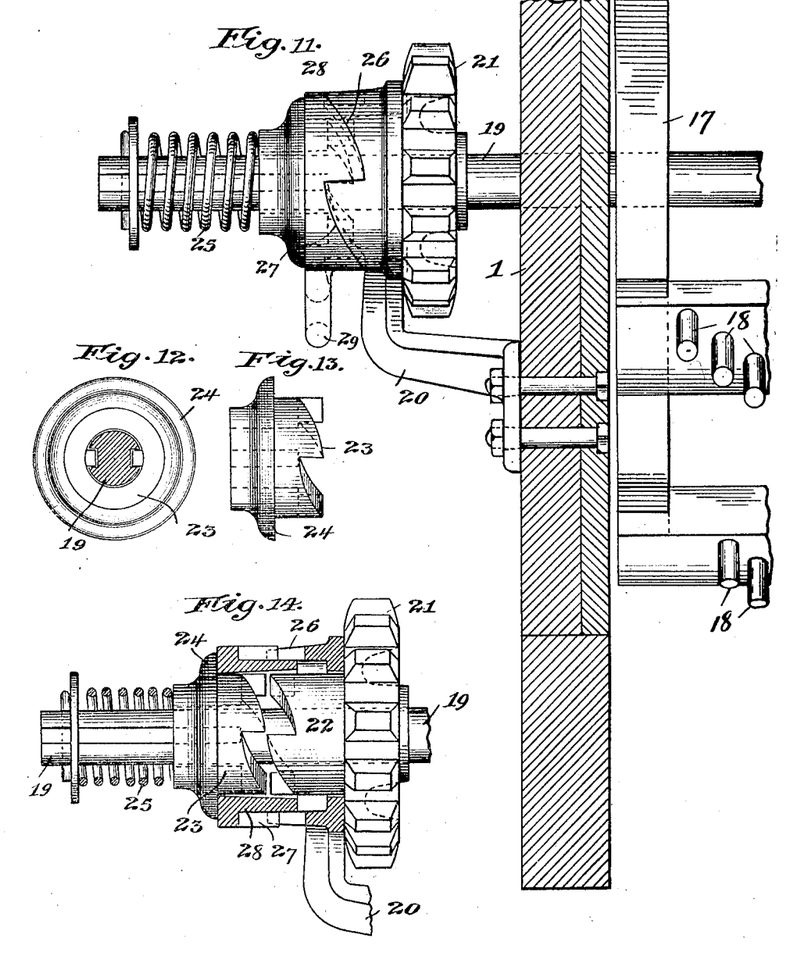
Figs. 11 to 14 inclusive are enlarged detail views of the drum-operating clutch and its actuating mechanism, Fig. 11 showing the members of the clutch engaged, Fig. 14 showing them disengaged, and Figs. 12 and 13 being respectively end and side views of the outer clutch-member.

9 designates the apron, which is made up of a series of transversely-extending slats connected centrally to an underlying sprocket-chain 10, the ends of which latter are each united by an underlying sprocket-chain section 11, the sprocket sections 10 and 11 forming together a continuous endless sprocket-chain which is mounted upon and carried by front and rear sprocket-wheels 12 and 13, respectively, carried by cross-shafts 14 and 15, respectively, suitably mounted beneath the front and rear ends of the wagon-body. The apron 9 carries on its forward end a transversely-extending fender 16. Suitably journaled on the rear end of the wagon-body between the sides thereof is the spreader-drum 17 having the usual series of radially-extending spreaders 18. The shaft 19 of the drum, as more particularly shown in Figs. 11 and 14, projects beyond one side of the wagon-body, through a bracket 20 secured to the latter, and has loosely mounted thereon a sprocket-wheel 21 provided with a clutch member 22 projecting from its outer face and rotatably supported in the bracket 20. Splined on the outer end of shaft 19 is a companion clutch member 23 having an annular flange 24 and backed by a spring 25 which normally tends to press said clutch member 23 into engagement with its companion clutch member 22. The outer edge of the annular portion of the bracket 20 is provided with a series of cams 26 disposed therearound, which co-operate with a corresponding series of cams 27 formed on the inner edge of a sleeve 28 that surrounds the clutch member 23 and, at its outer edge, abuts against the flange 24. The sleeve 28 has a depending perforated lug 29 adapted for connection with an operating-rod 30 in a manner hereinafter described. Fast with the hub of one of the rear wheels is a gear 31 that drives a smaller gear 32 on a short shaft 33 suitably mounted on the under side of the wagon-body in rear of gear 31, the shaft 33 also carrying a sprocket-wheel 34 which, through a sprocket-chain 35, drives the sprocket 21 on the drum-shaft, whereby, when the members of the clutch are thrown together, the spreader-drum is positively driven as the wagon advances.

Figures 6, 8:
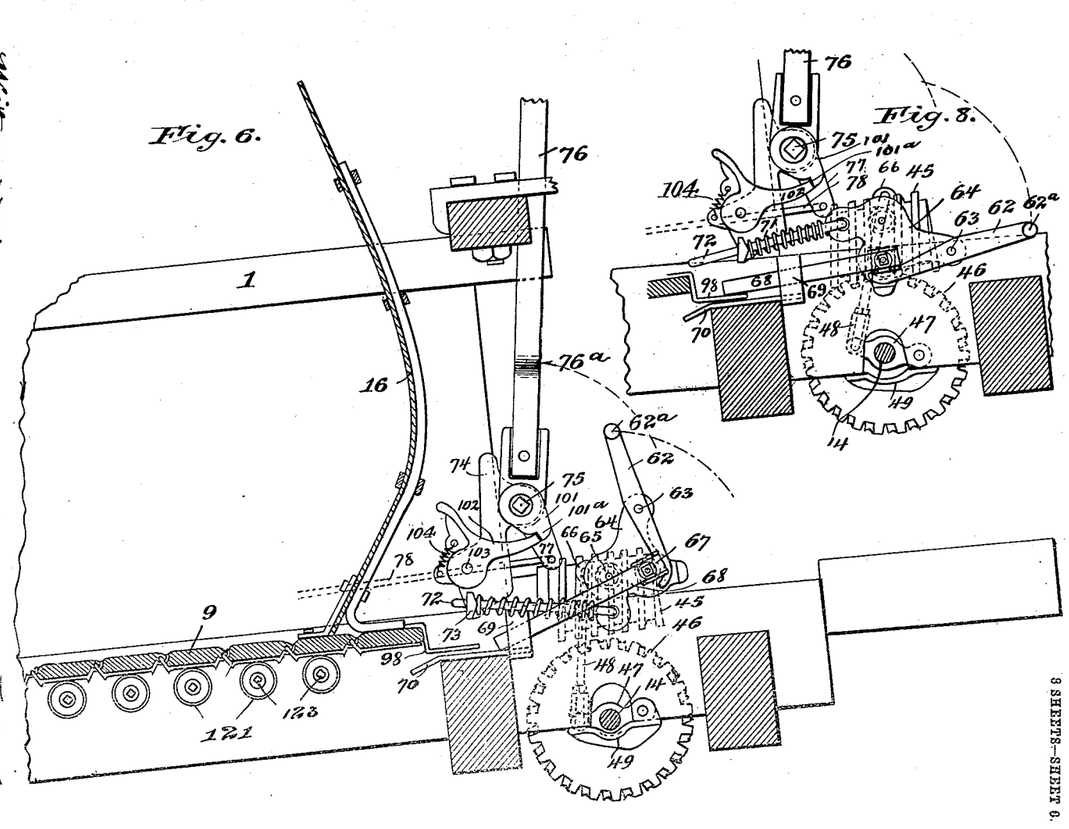
Fig. 6 is an enlarged side elevational view, partly in cross-section on line 6—7 of Fig. 3, of the forward portion of the body and platform frame, illustrating the loading position of the apron.
Fig. 8 is a detail sectional view of the foot-lever and the mechanism operated thereby when said foot-lever is thrown to its operative position.

The rear axle 4 is rotatably journaled on the under side of the wagon-body and is actuated on the forward travel of the vehicle by the rear wheels which are removably mounted thereon and engaged therewith by pawl-and-ratchet driving connection (not shown). On the axle 4, inside of the rear wheel on the opposite side of the body, is a sprocket-wheel 36, from which power is taken to operate the apron in both directions, as follows: From the sprocket 36 a sprocket-chain 37 extends around and drives a smaller sprocket 38 fast on a stub-shaft 39 projecting outwardly from a bracket 43 secured to the side of the wagon-body. On the outer face of sprocket 38 is a bevel-pinion 40 which engages and drives a bevel-pinion 41 on the rear end of a shaft 42 supported at one end in the bracket 43. Near its opposite end the shaft 42 is journaled in a bearing-block 44 projecting from the side of the body, and, beyond said bearing-block, has fast thereon a worm 45 adapted to engage and drive a worm-wheel 46, the latter being fast on the front transverse shaft 14 carrying the apron-operating sprocket 12. As best shown in Figs. 6 and 8, that end of the shaft 14 carrying the worm-wheel 46 is journaled in a vertically-movable journal-bearing member 47 that is pivoted at one end to a side frame member of the wagon-body and, at its other end, is connected to the lower end of a link 48, whereby said journal member carrying the shaft can be raised and lowered to throw the worm-wheel into and out of mesh with its operating worm; the journal bearing member, when in its lowest position in which the worm and worm-wheel are disengaged, resting upon a bracket support 49 underlying the same. It will be understood that the opposite end of the shaft 14 is journaled with sufficient looseness in its bearing to permit of the described limited vertical play of the shaft with its journal 47. On the shaft 42 inwardly of the bearing 44 are a series of gears of varying diameters placed side by side, said gears being numbered 50, 51, 52 and 53, counting from the largest to the smallest, and disposed in the order named.

Journaled in brackets 54 and 55 (the latter being a suspended journal) on the same side of the wagon-body is a shaft 56 that lies alongside of and substantially parallel with the bottom of the body; and connected with the forward end of said shaft by a knuckle-joint 57 is a shaft 58 which is rendered extensible relatively to the shaft 56 by having a squared end 58ª entering a square socket 57ª in the forward end of the knuckle-joint member 57. The shaft 58 carries at its forward end a gear 59 adapted to intermesh with any of the gears 50, 51, 52 and 53, according to the speed at which it is desired to drive the apron in the load-discharging operation. The rear end of the shaft 56 terminates in a worm 60 adapted to intermesh with a worm-wheel 61 fast on the rear apron-driving shaft 15, said worm and worm-wheel being designed to operate the apron in its rearward or load-discharging movement.

Since the worm 45 and worm-wheel 46 at the forward end of the machine drive the apron on its upward or return movement, while the worm 60 and worm-wheel 61 at the rear end drive the apron on its downward or discharging movement, it is essential that when either mechanism is in gear the other should be out of gear; while, when the machine is empty or is merely carrying a load to the place of deposit, both mechanisms should be idle. The control of these mechanisms is effected by simple hand and foot-operated lever devices within easy reach of the operator when in his seat. Such lever devices with their connections to the parts operated thereby may be described as follows, referring first to the mechanism for controlling the engagement of the front worm and worm-wheel 45 and 46. 62 designates a foot-lever having an inwardly-turned upper end 62ª (Fig. 5), said lever being pivoted between its ends at 63 to the upper portion of a rocker-plate 64 (Figs. 6, 7 and 8), that is keyed on a shaft 65 rotatably supported on and above the forwardly-projecting platform supports of the body frame. On the shaft 65 is an inwardly-projecting short arm 66, to the end of which is connected the upper end of the link 48. The lower end of the lever 62 has a concave friction bearing face that engages a rounded boss 67 on the outer end of a push-bar 68, the latter being pivotally connected through its boss 67 with the plate 64, and at its inner end passing through an inverted stirrup 69 and overlying a plate 70 supported on one of the cross-members of the bed-frame of the body.

Figures 7, 9:
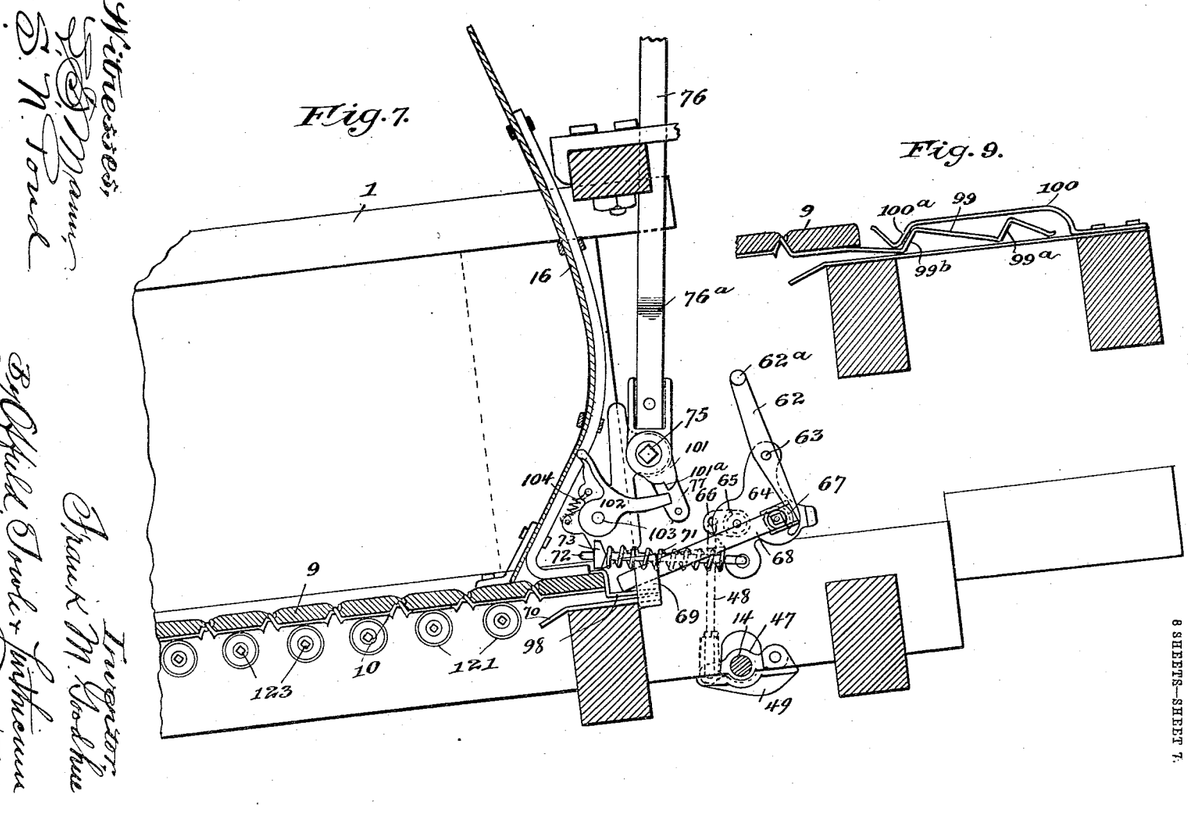
Fig. 7 is a view similar to Fig. 6, illustrating the position of the apron at the extreme limit of its forward travel which it occupies just prior to the spreading operation.
Fig. 9 is a detail view illustrating a double catch for retaining the apron in its two return positions.

From the foregoing it will be seen that when the lever 62 is pushed by the foot of the operator forwardly and downwardly from the position shown in Fig. 6 to the position shown in Fig. 8, the worm-wheel 46 will be raised into engagement with the worm 45; while, when the plate 64 is rocked in the opposite direction (by the means hereinafter described) the worm-wheel will be lowered to inoperative position at the same time that the lever 62 is returned to its upright position. The rocker-plate 64 is maintained fixed when set to either of its two positions as shown in Figs. 6 and 8 by means of a compression-spring 71 surrounding a rod 72 that is pivotally connected at its forward end to a depending arm of the plate 64 and at its rear end slidably engages an aperture in an inwardly-projecting lug 73 on a bracket 74 secured to the front end of the body-frame; the relations of the parts being such that the point of thrust of the spring when the plate 64 is upright as shown in Figs. 6 and 7 is below the pivotal center of the plate, while, when the latter is in its depressed position as shown in Fig. 8, the thrust of the spring acts along a line the projection of which lies above the pivotal center of the plate.

Figures 1, 16, 17:
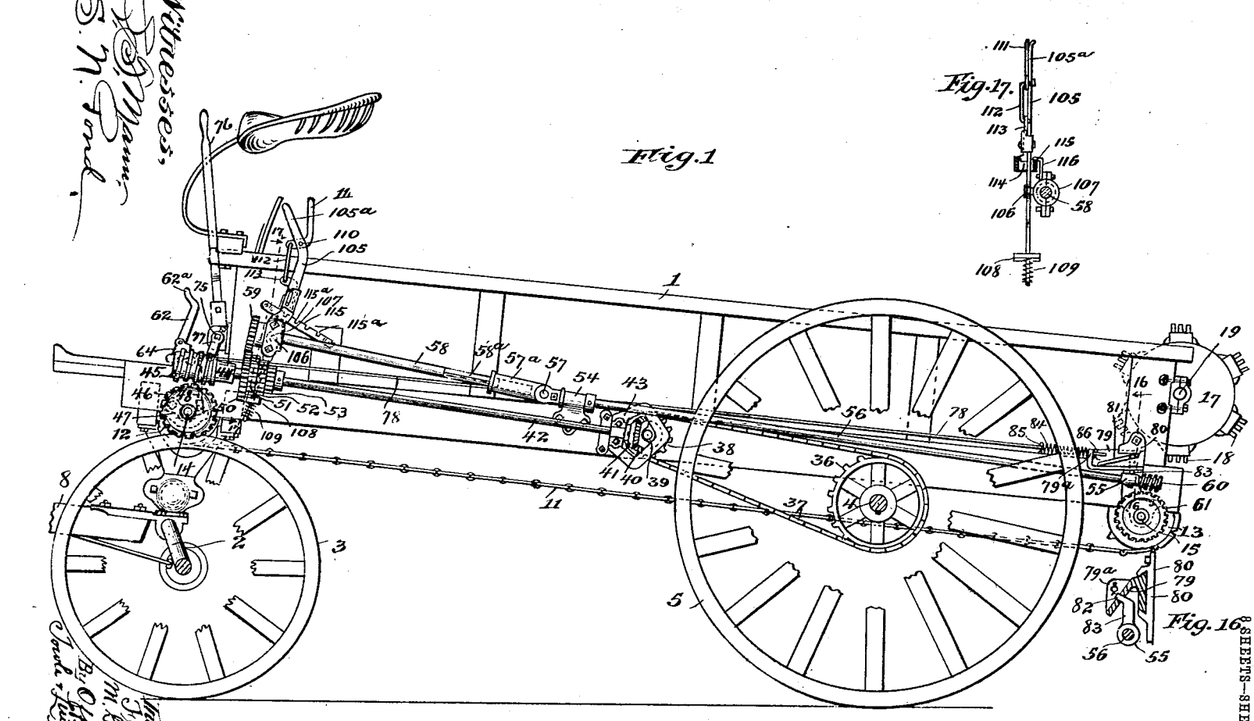
Figure 1 is a side elevational view of the spreader showing both of the apron-driving mechanisms disconnected.
Fig. 16 is a detail cross-sectional view of the rear worm-shifting mechanism substantially on the line 16—16 of Fig. 1.
Fig. 17 is a cross-sectional view of the actuating means of the speed-varying mechanism substantially on the line 17—17 of Fig. 1.

Referring next to the mechanism for throwing the rear worm and worm-wheel into and out of gear, 75 designates a square shaft disposed across the front of the body-frame and mounted with capacity for limited oscillation on its longitudinal axis. Fast on this shaft is a hand-lever 76 that is inwardly-offset intermediate its ends as indicated at 76ª (Fig. 5), and extends upwardly with its handle in convenient reach of the operator. On one end of shaft 75 is a depending arm 77, to the lower end of which is connected the forward end of a rod 78 (Fig. 1), said rod extending rearwardly along one side of the body-frame and at its rear end slidingly engaging a hole in a laterally-projecting lug 79ª on a plate 79 that is slidably mounted in ways in a bracket 80 secured to the side of the body-frame above the rear worm-driving mechanism (Fig. 16). The plate 79 has formed therein an oblique slot 81 which is engaged by a laterally-projecting finger 82 on a short upright arm 83 which carries at its lower end the suspended journal-bearing 55 of the worm-shaft 56. In order to make a non-rigid connection between the rod 78 and the slidable plate 79 I surround the former with a compression-spring 84 which, at one end, abuts against a stop 85 on the rod 78 and at its other end abuts against the lug 79ª; while a cotter-pin 86 passed through the rod 78 in rear of the lug 79ª forms a direct connection between said rod and the plate 79 when the rod is pulled forwardly.

From the foregoing it will be seen that when the hand-lever 76 is thrown forwardly and downwardly the shaft 75 is rocked in a direction to impart a rearward thrust through the rod 78 and spring 84 upon the plate 79, thus producing a rearward travel of the slot 81 over the finger 82 whereby the finger and its arm are lowered thus lowering the worm 60 upon and into gear with the worm-wheel 61. In this operation the spring 84 allows for such automatic adjustment between the slotted plate and the journal-carrying arm as will permit the spiral of the worm to readily settle between the teeth of the worm-wheel when lowered upon the latter. Conversely, when the hand-lever 76 is in its lowered position and it is desired to disengage the worm 60 and worm-wheel 61, the elevation of the hand-lever pulls the sliding plate 79 forward, thus causing finger 82 to ride upwardly and rearwardly of the slot 81 and elevate the rear end of shaft 56. It will be observed that the levers 62 and 76 as shown in Figs. 1 and 6 are both elevated to the position in which both the apron-driving mechanisms at the front and rear ends, respectively, are disengaged, which is a normal position of said parts when the wagon is traveling to or from its field of operation.

Referring next to the mechanism whereby the spreading reel is thrown into operation simultaneously with the establishment of the apron-driving connections at the rear, it will be observed that the rod 30 (Fig. 2) is pivotally connected at its forward end to the lower end of a short arm 87 that is fast on the end of the square shaft 75. From this it follows that the downward and forward throw of lever 76 rocks shaft 75 in a direction to move rod 30 rearwardly, thereby rocking the cam member 28 in a direction to permit the outer clutch member 23 to move inwardly into engagement with its companion clutch 22 under the compression of spring 25, thereby establishing driving communication between the hub of the rear wheel 5 and the shaft 19 of the spreader.

In order to insure safety to the machine when in the hands of ignorant, careless or unskilled operators, I have equipped the same with various mechanisms whereby the apron when at the end of either its outward or return travel automatically throws out of action its driving gear, as also the driving gear of the spreader at the termination of its outward travel, and whereby also the manipulation of the several levers out of correct order is prevented.

Figures 2, 10:
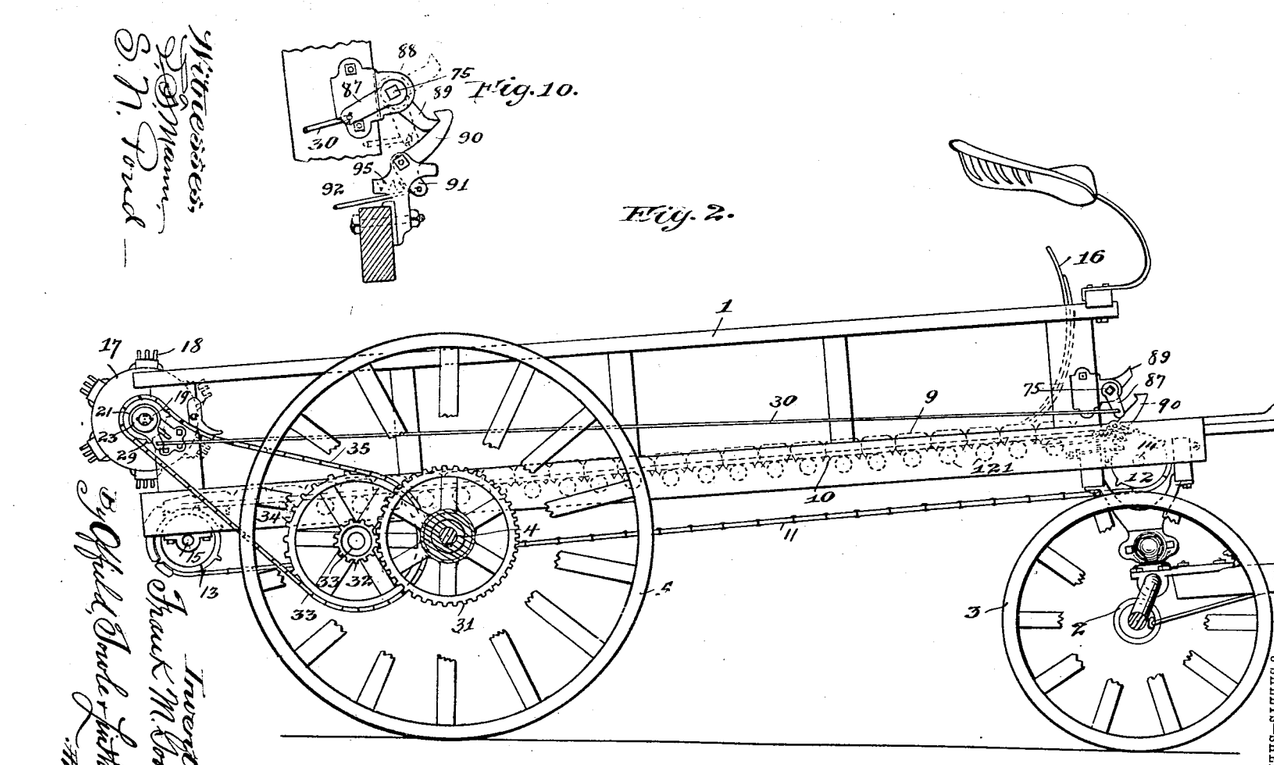
Fig. 2 is a similar view of the opposite side of the spreader.
Fig. 10 is a detail view illustrating the detent mechanism of the main lever-shaft.
Figure 3:
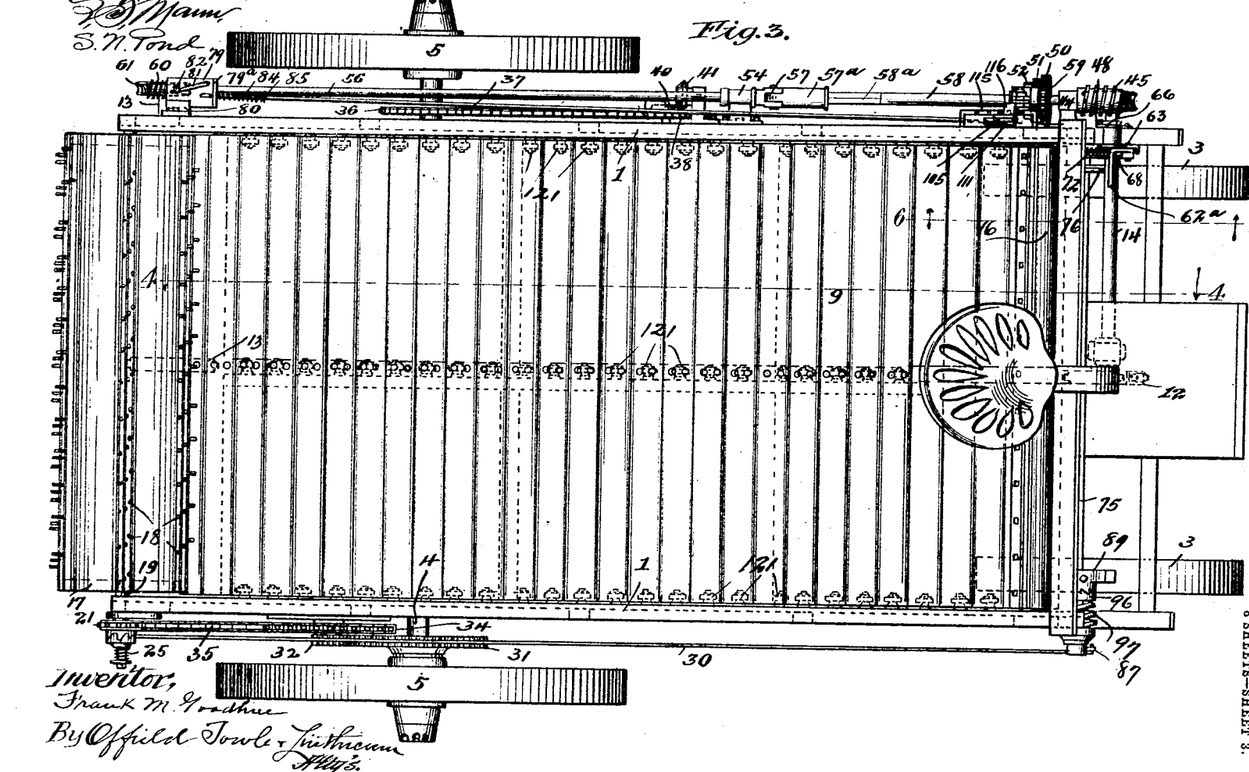
Fig. 3 is a top plan view of the same.
Figure 4:
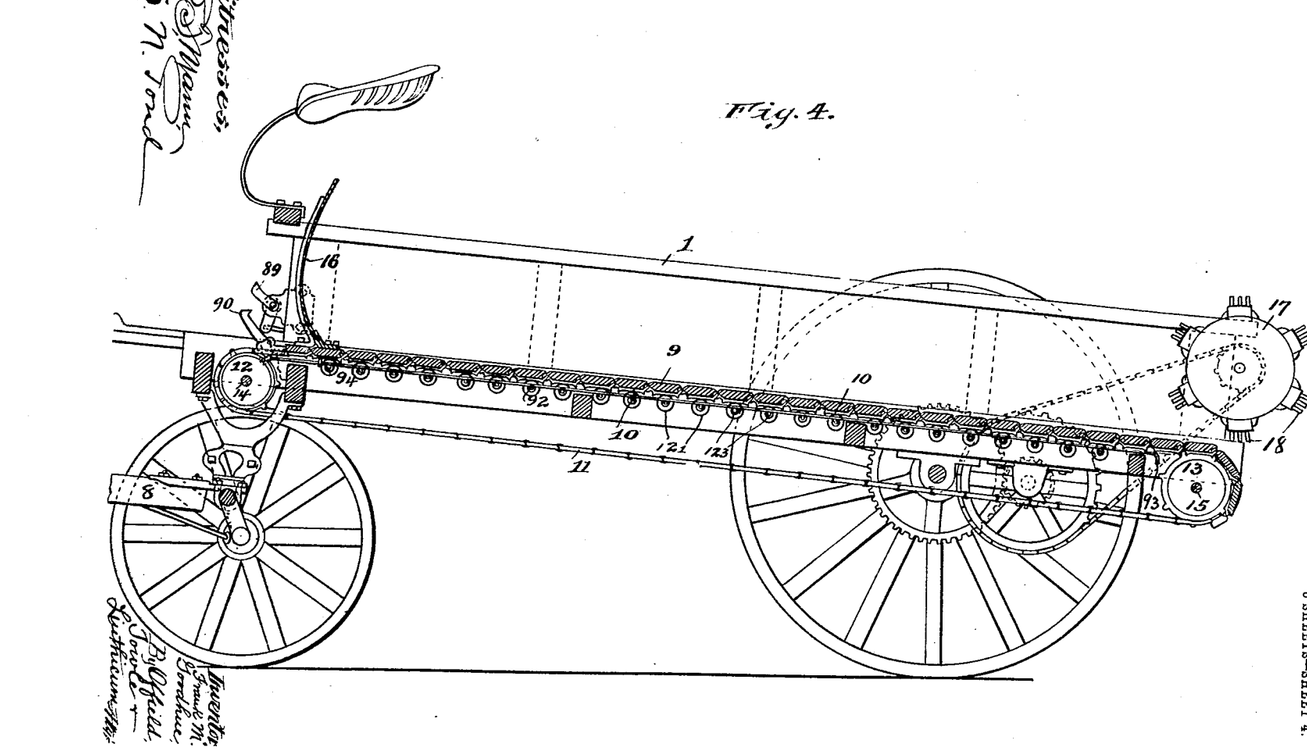
Fig. 4 is a longitudinal sectional view through the apron on line 4—4 of Fig. 3, with the spreader-drum in end elevation.
Figures 5, 15:
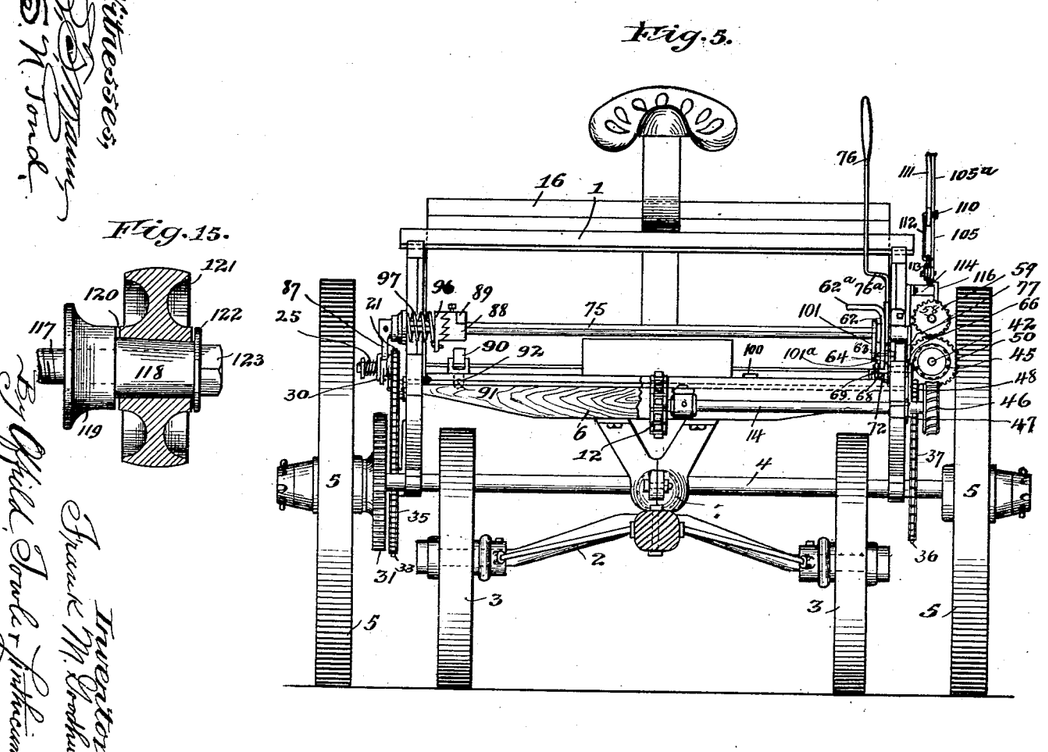
Fig. 5 is a front elevational view.
Fig. 15 is a detail view in cross-section of one of the apron-supporting rollers, illustrating the manner and means of mounting the same.

Referring first to the means for automatically stopping the rotation of the spreader and the rearward travel of the apron, this is accomplished through the agency of a spring-actuated mechanism which normally tends to rotate the front shaft 75 in a direction to restore the hand-lever 76 to its idle or upright position. This mechanism is best shown in Figs. 5 and 10, wherein it will be seen that 88 designates a hub adjustably mounted on shaft 75, said hub having projecting therefrom an upwardly and forwardly-extending trip-arm 89, the nose or point of which is adapted, when lever 76 is rocked downwardly, to engage the upper hooked end of a trip-lever 90 that is pivotally mounted beneath the same, and has its depending arm 91 connected to the forward end of a rod 92 that runs back beneath the upper section of the apron (Fig. 4) and terminates slightly in advance of rear shaft 15 in a downwardly-bent end or hook 93. This rod is surrounded by a staple 94 secured in the under side of one of the forward slats or lags of the apron. The lever 90 is normally pressed into engaging position relatively to the finger 89 by means of a spring 95 (Fig. 10), which normally tends to maintain the rod 92 in its forward position. The outer face of the hub 88 is toothed and engages a correspondingly toothed face of a collar 96 also mounted on rod 75, between which collar and the adjacent face of the journal-bracket of shaft 75 is interposed a strong torsional spring 97. When, now, the apron has run out to practically the limit of its load-discharging travel, the staple 94 contacts the hook 93, drawing rod 92 rearwardly and thereby rocking lever 90 so as to break its detaining engagement with finger 89. The torsional spring 97 then acts to rock shaft 75 in a direction to restore lever 76 to its upright position, which operation effects a forward pull on connecting rod 30, thereby separating the members of the spreader-driving clutch, and stopping the operation of the latter. The backward oscillation of shaft 75 also at the same time, through arm 77, effects a forward pull on the other longitudinal rod 78 lying on the opposite side of the body, which disengages the worm 60 and apron-driving worm-wheel 61 in the manner already described.

For the purpose of automatically disengaging the front apron-driving mechanism upon the return of the apron to its forward or load-receiving position, I provide the forward end of the apron with a bent tripper-finger 98 (Figs. 6, 7 and 8) which projects forwardly of the front lag-strip and is adapted to over-ride the plate 70 and strike the rear end of the push-bar 68, which action rocks the plate 64 sufficiently to call into action the spring 71, thereby completing the oscillation of plate 64, lowering worm-wheel 46 out of engagement with its driving worm 45, and restoring foot-lever 62 to its normal upright position.

When the wagon-body has been loaded, the rear end of the load, of course, lies against the inner face of the distributing drum; and when the discharge of the load is begun it is desirable to retract the load slightly away from the drum in order that the latter may not be compelled to start up against the full braking effect of the load lying thereagainst. For this purpose the return movement of the apron is automatically terminated by the mechanism last described a few inches short of the limit of the full return movement of which it is capable. When the place at which the load is to be discharged has been reached, the operator, without stopping the team, first depresses lever 62 with his foot, which rocks the plate 64, the lower end of lever 62 at the time frictionizing upon the roll 67 so as to raise the inner end of push-bar 68 above the plane of the downwardly-offset front portion of trip-finger 98, and, by the bodily rearward movement of push-bar 68, cause its inner end to overlie said portion of the trip-finger. The team continuing to advance, the loaded apron moves forwardly a few inches until the vertical portion of the trip-finger 98 strikes the end of the push-bar 68, again rocking plate 64 and disengaging the mechanism for returning the apron. This retracts the load to a position in which it is practically clear of the spreading-drum, thus enabling the latter to be easily started.

In order to retain the apron in the two return positions described I provide on the under side of the forward end of said apron a forwardly-projecting finger 99 so bent as to provide a pair of catches 99$^a$ and 99$^b$ (Fig. 9); and to the platform frame I secure a co-operating rearwardly-extending spring-finger 100 having a downwardly-bent catch 100$^a$ adapted to engage, first with catch 99$^a$ when the apron is returned to load-receiving position, and subsequently with catch 99$^b$ when the apron has been still further advanced to load-discharging position.

The catches above described have sufficient holding power to retain the empty or loaded apron when the machine is idle, but yield and separate readily when the apron-driving mechanism is set in operation.

In order to insure the preliminary retraction of the load from the surface of the spreading drum prior to the spreading operation in the manner above described and prevent the connecting up of the spreader-drum actuating mechanism before this has been done by the premature actuation of hand-lever 76, I provide a mechanism for locking the latter against downward movement until the load has thus been retracted. The mechanism for this purpose, as herein shown, comprises a short depending arm 101 on the square shaft 75 which terminates in a nose 101$^a$ (Figs. 6 and 7) adapted to abut against one end of a trip-lever 102 pivoted at 103 on one of the journal-bearing brackets of shaft 75, said lever being normally maintained in locking relation to the arm 101, as shown in Fig. 6, by a tension-spring 104. The other arm of the lever lies in front of the fender 16, and is struck by the latter to release the arm 101 and permit hand-lever 76 to be operated when the fender has reached the extreme limit of its forward movement, at which time the load has been retracted from the spreading drum. And, further, in order to prevent the possibility of connecting the two oppositely-acting apron-driving mechanisms at the same time by a forward and downward thrust of both the levers 62 and 76, I provide a stop on the lever 76 which may conveniently be formed by its laterally-offset portion 76$^a$, which, when said lever is thrown forward to a position to connect the reel and rear apron-driving mechanisms, lies directly across the path of movement of the upper portion of lever 62; it being impossible to throw lever 62 down before throwing lever 76 forward, when the machine is in the position shown in Fig. 7, by reason of the abutment of the inner end of the push-bar 68 against the vertical portion of trip-finger 98. The intersecting paths of travel of the parts 62$^a$ and 76$^a$ are indicated by curved dotted lines in Figs. 6 and 8.

The mechanism for changing the engagement of gear 59 with the several gears 50, 51, 52 and 53 to vary the speed at which the apron is driven on its outward or discharging travel consists of the following. Referring to Figs. 1, 5 and 17, 105 designates a lever which is pivoted at 106 to the inner side of the journal-bearing 107 carrying the forward end of shaft 58, the lower end of said lever passing through an apertured lug 108 on the side of the wagon-body and being provided with a compression-spring 109 on its lower end normally tending to draw the lever downwardly. Said lever has at its upper end a forwardly-bent hand-grip 105$^a$. Pivoted to the lever 105 at 110 just beneath the hand-grip 105$^a$ is a companion hand-grip lever 111 in bell-crank form, the lower end of which is connected by a link 112 to the upper end of a thrust-bar 113, the foot of this bar being stepped on an inclined stationary support 114 secured to the side of the wagon-body. Said support 114 is longitudinally slotted to permit movement of lever 105 therethrough, and has on its outer edge an upstanding flange 115 that is provided with a series of notches 115$^a$, these latter being designed to seat an inwardly-bent locking-finger 116 secured to the journal-bearing 107. When, now, the hand-grips 105$^a$ and 111 are grasped and drawn together, the lever 105 is raised thereby against spring 109, carrying with it the journal-bearing 107 and locking-finger 116 which is thereby retracted from its co-operating notch. Thereupon the lever 105 is swung forwardly or rearwardly, as the case may be, carrying with it the shaft 58 and gear 59, the foot of thrust-bar 113 sliding over the face of the support 114 to permit such movement; this movement being continued to an extent necessary to bring gear 59 directly over that one of the series of underlying gears with which it is intended to co-operate, when, on releasing the levers, the spring 109 immediately draws lever 105 downwardly, thereby carrying the locking-finger 116 into engagement with the appropriate notch.

The apron is supported upon the bottom or floor frame of the wagon-body in a practically frictionless manner by means of several longitudinal rows of rollers mounted on the latter lengthwise thereof and contacting the under side of the apron. Any suitable number of rows of rollers may be employed, but I have found that a row supporting the two longitudinal edges of the apron and a substantially central intermediate row are sufficient for all practical purposes. These rollers are secured on the faces of longitudinal floor frame members of the wagon-body; and a very durable and efficient construction and mode of mounting the same consists of the following.

Referring to the detail Fig. 15, 117 designates a lag-screw set into the side of the sill, on which is mounted a hardened sleeve or bushing having a slightly conical or tapered portion 118 serving as a journal-bearing for the roller and a diametrically enlarged spacing member 119 that forms with the bearing member 118 an annular shoulder 120 against which one end of the hub of the roller is confined. On the bearing 118 is mounted the roller 121, the opposite end of the hub of which is confined by a washer 122, the roller and washer being in turn confined endwise by the head 123 of the lag-screw 117. The bearing 118 is of slightly greater length than the hub of the roller, thus always insuring a free rotation of the latter; while the lag-screw may be turned up hard to securely confine the roller against endwise displacement.

The operation of the apparatus has been to a considerable extent indicated in the foregoing description, but may be briefly and connectedly described as follows: Assuming that the device is in load-receiving position, in which position both of the levers 76 and 62 are raised, and the catch 100$^a$ is engaged with catch 99$^a$, with the fender in the relative position indicated in Fig. 6, the wagon is loaded and driven to the field on which the manure is to be spread. Arrived there, the operator without stopping the team first depresses the foot-lever 62, which through the friction device 67 raises the rear inner end of push-bar 68 into position to be struck by the vertical part of the trip-finger 98, and at the same time throws into engagement the front worm and worm-wheel, the main hand-lever 76 being meanwhile locked against actuation by the locking-lever 102, all as shown in Fig. 8

The team continuing, the loaded apron is advanced a few inches until the push-bar 68 is struck, thereby rocking the plate 64, returning lever 62 to upright position, releasing hand-lever 76, disengaging the front apron-driving mechanism, and retracting the load from the face of the spreader-drum; the catch 100$^a$ at the same time passing from catch 99$^a$ into engagement with catch 99$^b$, and holding the loaded apron in its fully advanced position, all as indicated in Figs. 7 and 9. By the same movement the fender 16 has tripped the catch 102, and the operator then throws the lever 76 downwardly and forwardly, until it is held by catch 90 engaging finger 89, see Fig. 10 in which position the locking portion 76$^a$ of said lever lies across the path of movement of lever 62 and prevents improper actuation of the latter lever. This, through the several connections described, throws into engagement the two members of the drum-operating clutch, and, at the same time, throws into engagement the rear apron-driving worm and worm-wheel. If at this time the gear 59 is not engaged with that one of the series of power transmitting and speed-determining gears 50, 51, 52 and 53 which gives the desired rate of movement to the apron, the operator, through the grip-levers 111 and 105, sets the gear 59 into engagement with the proper co-operating underlying gear. Upon the subsequent continued draft of the team, the rotation of the spreader-drum and rearward travel of the apron continue at a uniform rate, the manure being scattered by the drum, until, when near the limit of its outward travel, the staple 94 on the under side of the forward end of the apron engages the hook 93, and, pulling on the rod 92, releases the catch-lever 90, thus allowing the torsion-spring 97 to oscillate the shaft 75 in a direction to return hand-lever 76 to upright position, this actuation of shaft 75 at the same time disengaging the rear worm and worm-wheel and preventing further outward actuation of the apron. The same oscillation of shaft 75, through the connections on the opposite side of the wagon-body, separates the members of the drum-driving clutch, and stops the rotation of the drum simultaneously with the stoppage of the apron travel. The return of lever 76 to upright position leaves lever 62 free to be operated, whereupon said lever is depressed by the foot of the operator, thereby bringing into driving engagement the front worm and worm-wheel, thus causing the return or upward travel of the empty apron as the team advances. When the apron has returned to a position in which the trip-finger 98 strikes the push-bar 68, the forward worm-driving connections are automatically disengaged, the catch 100$^a$ at the same time engaging the catch 99$^a$ to hold the apron in such position. The wagon is then driven back to the source of load supply with its several operating mechanisms idle, reloaded, and the same series of operations repeated.

From the foregoing it will be seen that the hand and foot lever at the front control all the operations of the machine, except the speed regulation which is controlled by the gripping-levers at the side of the machine, said levers being so arranged as to be impossible of improper manipulation to break any of the operating parts; while the apron itself automatically disengages its driving connections at the limits of both the outward and return travel.

Any or all of the levers may be thrown into operation without the necessity of stopping the team; the speed-controlling lever being capable of manipulation to spread the manure thicker or thinner as the nature of the soil at various places may require, while the team is continuously traveling over the field.

1. In a manure spreader, the combination with a reciprocating load-carrying apron, of means normally out of gear for actuating said apron in a rearward direction, a manually operable lever for throwing said actuating means into gear, a locking device normally holding said lever in inoperative position, said locking device being automatically releasable by the apron at the limit of its return movement, substantially as described.

2. In a manure spreader, the combination with a reciprocating load-carrying apron, of means normally out of gear for actuating said apron on its return movement, a foot-operated lever for throwing said actuating means into gear, and a tripping mechanism automatically actuated by the apron when the latter has returned to either its load-receiving position or the full limit of its return movement, substantially as described.

3. In a manure spreader, the combination with a reciprocating load-carrying apron, of mechanism for actuating said apron on its return movement, said mechanism including a worm and a worm-wheel movable bodily toward and from said worm, a foot-operated lever and connections therefrom to said worm-wheel whereby the latter is moved into and out of gear with said worm, and a tripping mechanism automatically actuated by the apron on its return movement serving to disengage said worm and worm wheel and restore said lever to normal position, substantially as described.

4. In a manure spreader, the combination with a rotatable spreader-drum, of a sprocket-wheel loosely mounted on the drum-shaft having a hub constituting one member of a clutch, a companion clutch member splined on said shaft, a spring normally tending to force said clutch members into engagement, and cam-faced members surrounding said clutch members and having a relative rotary movement through which said clutch members are separated to disconnect said spreader-drum from its driving means, substantially as described.

5. In a manure spreader, the combination with a load-carrying apron and a rotatable spreader-drum, of a sprocket wheel loosely mounted on the drum shaft having a hub constituting one member of a clutch, a companion clutch member splined on said shaft, a spring normally tending to force said clutch members into engagement, co-operating stationary and rotatable cam-faced collars surrounding said clutch members, manually operable means for actuating said rotatable cam-faced collar in a direction to permit the engagement of said clutch members, and means automatically set into operation by the apron at the limit of its outward movement serving to turn said rotatable collar in the opposite direction, to separate said clutch members, substantially as described.

6. In a manure spreader, the combination with a body-frame and a reciprocable load-carrying apron mounted thereon, of a plurality of rows of rollers mounted on said body-frame beneath and longitudinally of said apron and supporting the latter, each of said rollers comprising a fixed shaft, a hardened bushing mounted thereon, said bushing having a conical bearing and an annular shoulder, a roller mounted on said conical bearing, and means carried by said shaft serving to confine said bushing thereon and further co-operating with said annular shoulder of the bushing to confine said roller on the latter with freedom of rotary movement, substantially as described.

7. In a fertilizer distributer, in combination, a hopper, a carrying wheel for the hopper, a movable bottom for the hopper, means actuated by the carrying wheel for moving the hopper bottom, and automatic means for arresting the movement of the bottom as it is extended within the hopper before the limit of such movement is reached.

8. In a manure distributer, in combination, a load support, a rotatable beater, means for relatively moving the support and the beater to cause the beater to act on all parts of the load, means for returning the movable member to its normal position, and automatic means for arresting such return movement before the movable member has reached its normal position.

9. In a manure spreader, the combination with a reciprocating load-carrying apron, of means normally out of gear for actuating said apron on its return movement, a lever for throwing said actuating means into gear, and a tripping mechanism automatically actuated by the apron when the latter has returned to either its load-receiving position or the full limit of its return movement, substantially as described.

FRANK M. GOODHUE

Witnesses:
SAMUEL N. POND,
FREDERICK C. GOODWIN.